US008894955B2

(12) United States Patent
Smits et al.

(10) Patent No.: US 8,894,955 B2
(45) Date of Patent: *Nov. 25, 2014

(54) PROCESS FOR REMOVING MERCAPTANS FROM A GAS STREAM

(75) Inventors: Jozef Jacobus Titus Smits, Amsterdam (NL); Sipke Hidde Wadman, Amsterdam (NL)

(73) Assignee: Shell Oil Cpmpany, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/991,676

(22) PCT Filed: Dec. 6, 2011

(86) PCT No.: PCT/EP2011/071869
§ 371 (c)(1),
(2), (4) Date: Aug. 5, 2013

(87) PCT Pub. No.: WO2012/076502
PCT Pub. Date: Jun. 14, 2012

(65) Prior Publication Data
US 2013/0302233 A1   Nov. 14, 2013

(30) Foreign Application Priority Data

Dec. 6, 2010 (EP) .................... 10193850

(51) Int. Cl.
*B01D 53/48* (2006.01)
*C10L 3/10* (2006.01)
*C09K 3/00* (2006.01)
*B01D 53/72* (2006.01)
*B01D 53/14* (2006.01)

(52) U.S. Cl.
CPC ......... *C10L 3/103* (2013.01); *B01D 2252/2056* (2013.01); *B01D 2257/504* (2013.01); *B01D 2258/06* (2013.01); *B01D 2256/24* (2013.01); *B01D 2257/304* (2013.01); *B01D 53/72* (2013.01); *B01D 53/1487* (2013.01); *B01D 53/1493* (2013.01); *B01D 2252/20431* (2013.01); *B01D 2252/20489* (2013.01); *B01D 2252/20405* (2013.01); *B01D 2257/306* (2013.01); *B01D 53/48* (2013.01); *B01D 2257/308* (2013.01)
USPC .................. 423/242.1; 423/242.2; 423/242.7; 423/243.01; 423/226; 48/127.3; 48/127.5; 252/184; 252/189; 95/235

(58) Field of Classification Search
USPC ........... 423/242.1, 242.2, 242.7, 243.01, 226; 48/127.3, 127.5; 252/184, 189; 95/235
See application file for complete search history.

(56) References Cited

U.S. PATENT DOCUMENTS 4,020,144 A * 4/1977 Bosniack ...................... 423/226
4,705,620 A   11/1987 Bricker et al.
8,419,832 B2 * 4/2013 Capdeville et al. ............. 95/235

FOREIGN PATENT DOCUMENTS

| EP | 2025386 | 2/2009 |
|----|---------|--------|
| FR | 2928563 | 9/2009 |
| FR | 2953147 | 6/2011 |
| GB | 1551344 | 8/1979 |
| WO | 03062177 | 7/2003 |
| WO | 2009156621 | 12/2009 |
| WO | 2010060975 | 6/2010 |

* cited by examiner

Primary Examiner — Timothy Vanoy

(57) ABSTRACT

The present invention provides a process for removing mercaptans from a gas stream. In the process, a first mercaptan-comprising gas stream comprising at least a mercaptan of the general formula: $R_1$—SH, wherein $R_1$ is an alkyl group comprising 1 to 4 carbon atoms, and an acid component is contacted with an absorption medium to obtain a mercaptan-depleted gas stream. The absorption medium includes a substituted disulphide and a base. The substituted disulphide is of the general formula $R_2$—SS—$R_3$, wherein $R_2$ and $R_3$ are carbon comprising substituents of which the corresponding $R_2$—SH and $R_3$—SH thiols have a vapor pressure below the vapor pressure of any $R_1$—SH thiol, and at least one of $R_2$ and $R_3$ is an electron withdrawing group.

11 Claims, No Drawings

PROCESS FOR REMOVING MERCAPTANS FROM A GAS STREAM

PRIORITY CLAIM

The present application claims priority from PCT/EP2011/071869, filed 6 Dec. 2011, which claims priority from European application 10193850.4, filed 6 Dec. 2010, which is incorporated herein by reference.

The invention relates to a process for removing mercaptans from a gas strewn.

Generally, natural gas comprises mainly methane and can further comprise other components such as higher hydrocarbons (e.g. ethane, propane, butanes, pentanes). In addition, it may also comprise significant amounts of undesired sulphur contaminants and carbon dioxide.

Common sulphur contaminants are hydrogen sulphide ($H_2S$), mercaptans (RSH), also referred to as thiols, and carbonyl sulphide (COS).

One process for removing hydrogen sulphide, COS and carbon dioxide uses an amine-containing absorption liquid based on a chemical absorbent, also referred to as selective amine absorption process. In this process, a gas stream comprising hydrogen sulphide, COS and carbon dioxide is contacted with the amine-containing absorption liquid in an absorption unit, also referred to as amine treating unit. The hydrogen sulphide, COS and carbon dioxide are selectively absorbed in the amine-containing absorption liquid and thereby removed from the gas stream.

A disadvantage of such a process is that it does not provide an efficient absorption of mercaptans.

A well known adaption of this selective absorption process is obtained by using an amine-containing absorption liquid based on a mixed absorbent, i.e. a absorbent comprising both a chemical absorbent and a physical absorbent, e.g. sulfinol. Such a mixed absorbent-based absorption liquid can also capture the mercaptans from the gas stream. Such a process is for instance described in WO2010060975. A disadvantage of the use of mixed absorbents-based absorption liquids is that also $C2^+$ hydrocarbons, also referred to as condensates are absorbed together with the sulphur contaminants and the carbon dioxide. As these condensates are valuable products, an additional separation of the condensates from the sulphur contaminants and the carbon dioxide is required.

Alternatively, a natural gas, from which the hydrogen sulphide and carbon dioxide have been removed by for instance treatment with a selective amine absorption process, is further treated to remove mercaptans by a process as for instance provided in U.S. Pat. No. 4,705,620. In this process, which is typically used to remove mercaptans from LPG, propane, butanes, light naphthas, kerosene and jet fuel, the mercaptans are removed by converting them by oxidation to liquid hydrocarbon disulfides. The mercaptans are reacted in water with a stoichiometric amount of caustic to form the corresponding sodium salts, e.g. $CH_3$—S—Na. This salt is oxidized with air to form a disulphide, e.g. $CH_3$—SS—$CH_3$, and NaOH, which will be recycled. A disadvantage of this process is that it requires an oxidation step to remove the mercaptans.

There is a need for a process for removing mercaptans from gas streams wherein an additional oxidation step is omitted, without absorbing significant amounts of condensate.

It has now been found that mercaptan contaminants may be removed from a gas stream through a reversible absorption step by contacting the mercaptan-comprising natural gas stream with a specific substituted organic disulphide in combination with at least catalytic amounts of a base.

Accordingly, the present invention provides a process for removing mercaptans from a gas stream, comprising the steps:

a) providing a first mercaptan-comprising gas stream comprising at least:

a mercaptan of the general formula:

wherein $R_1$ is an alkyl group comprising 1 to 4 carbon atoms; and in the range of from 0 to 20 vol % of acid components; and b) contacting the mercaptan-comprising gas stream with an absorption medium comprising:

a substituted disulphide, wherein the amount of the substituted disulphide used in the absorption medium is chosen on the basis of at least equimolarity to the amount of the mercaptan that is to be removed;

a base, which, in case any acid components are present in the first mercaptan-comprising gas stream, is provided in a mol ratio to the acid components exceeding the stoichiometric mol ratio of base to acid components, and wherein, in addition, at least a catalytic amount of the base is present in the absorption medium;

to obtain a second mercaptan-depleted gas stream, wherein the substituted disulphide is of the general formula:

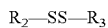

wherein:

$R_2$ and $R_3$ are carbon comprising substituent of which the corresponding $R_2$—SH and $R_3$—SH thiols have a vapour pressure below the vapour pressure of any $R_1$—SH thiol; and at least one of $R_2$ and $R_3$ is or is part of an electron withdrawing group.

The process according to the present invention allows for the reversible absorption of mercaptans from the natural gas and efficient purification thereof.

Additionally, the process according to the invention does not require a mercaptan oxidation step following the reaction with a caustic solution.

In GB 1551344, a process is described using organic disulphides as absorbent for contaminating gaseous sulphur compounds from gas streams. Although it is mentioned that the gas stream may contain methyl mercaptan, the process is in particular directed to the removal of $H_2S$ from gas streams. It was further disclosed that methanolamine, a base, may be present as an additional absorbent. However, this was found to lead to less selectivity for removal of $H_2S$ over $CO_2$. In contrast, according to the present invention, the presence of at least catalytic amounts of a base is necessary for efficient removal of mercaptans.

Further, WO 2009/156621 describes an absorbent solution for deacidification of gaseous effluents, containing organosulphur compounds bearing a carbonyl group as degradation inhibitors for the absorbent solution. Although WO 2009/156621 also refers to the use of organic disulphides, it does not disclose findings relating to the removal of mercaptans; it specifically deals with degradation inhibitory activity of certain organosulphur compounds.

In another aspect the invention provides a substituted disulphide solution, for use as an absorption medium for removing mercaptans from a gas stream, comprising:

i) a substituted disulphide of the general formula:

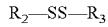

wherein:

$R_2$ and $R_3$ are carbon comprising substituent of $R_2$ and $R_3$ are carbon comprising substituent of which the corresponding $R_2$—SH and $R_3$—SH thiols have a vapour pressure below the vapour pressure of any butyl-SH thiol, and at least one of $R_2$ and $R_3$ is or is part of an electron withdrawing group, and
ii) a base,
wherein:
the amount of the substituted disulphide constitutes 1-10 mass % of the substituted disulphide solution; and the base is present in at least 3 mol % with regard to the amount of the substituted disulphide.

In an embodiment of the invention, the substituted disulphide solution is non-aqueous.

In the process according to the present invention mercaptans are removed from a mercaptan-comprising gas stream.

The mercaptan-comprising gas steam comprises at least mercaptans of the general formula:

$$R_1\text{—SH} \qquad (1)$$

wherein $R_1$ is an alkyl group comprising 1 to 4 carbon atoms.

Reference herein to mercaptans (R—SH) is to aliphatic mercaptans. The invention especially involves removal of methyl mercaptan (R=methyl), ethyl mercaptan (R=ethyl), normal- and iso-propyl mercaptan (R=n-propyl and i-propyl) and butyl mercaptan (R=butyl) isomers. These mercaptans have vapour pressures the range of from 5 to 210 kPa measured at 25° C.

In step (b) of the process according to the invention the mercaptan-comprising gas stream is contacted with an absorption medium. The absorption medium comprises a substituted disulphide of the general formula:

$$R_2\text{—SS—}R_3 \qquad (2)$$

wherein:
$R_2$ and $R_3$ are carbon comprising substituent of which the corresponding $R_2$—SH and $R_3$—SH thiols have a vapour pressure below the vapour pressure of any $R_1$—SH thiol, preferably below the vapour pressure of any butyl thiol.

Reference herein to the vapour pressure of a thiol is to the vapour pressure of a thiol as measured at 25° C. according to ASTM E1194 for thiols having a vapour pressure in the range of from $1\times10^{-11}$ to 1 kPa and ASTM 2879 for thiols having a vapour pressure above 1 kPa, wherein in case of doubt the vapour pressure according to the method of ASTM E1194 takes precedents. In case a thiol has a vapour pressure below $1\times10^{-11}$ kPa, the vapour pressure of the thiol is for the purposes of the invention considered to be zero.

Without wishing to be bound to any particular theory, it is believed that the $R_1$SH mercaptan reversibly reacts with the substituted disulphide in the absorption medium. During this reaction with the substituted disulphide, a $R_2$—SH and/or $R_3$—SH thiol is formed together with a $R_2$—SS—$R_1$ and/or $R_1$—SS—$R_3$ disulphide, although energetically less favourable, minor amounts of $R_1$—SS—$R_1$ may be formed. Due to the higher vapour pressure of the formed thiols, the process conditions under which mercaptan-comprising gas stream is contacted with an absorption medium can easily be chosen such that most of or essentially all of the formed thiols remain captured in the absorption medium in solid, liquid or dissolved form together with the newly formed substituted disulphides, which generally have low vapour pressures.

Preferably, $R_2$ and $R_3$ are carbon comprising substituents of which the corresponding $R_2$—SH and/or $R_3$—SH thiols have a vapour pressure below 1 kPa, more preferably below 0.5 kPa, even more preferably 0.01 kPa, still even more preferably 0.001 kPa as determined as defined herein above.

$R_2$ and $R_3$ may be the same or different. In case, $R_2$ and $R_3$ are the same, the variety of thiols formed is reduced, making the selection of the operation conditions and optional regeneration conditions easier. In case $R_2$ and $R_3$ are different, one of them is an electron withdrawing group and the other may be another electron withdrawing group or another suitable group as further defined herein. Preferably, $R_2$ and $R_3$ are different. Different substituents have a different tendency to react with the $R_1$—SH in the feed stream. By selecting $R_2$ and $R_3$ such that the tendency to react with the $R_1$—SH is significantly different, the formation of undesired $R_1$—SS—$R_1$ can be reduced if not essentially prevented.

According to the invention, the amount of the substituted disulphide in the absorption medium used in the process of this invention is chosen on the basis of at least equimolarity to the amount of the mercaptan that is to be removed. Preferably, the amount of the substituted disulphide constitutes 0.001-10% m/m of the absorption medium used in the process of this invention, preferably 0.01-10% m/m and more particularly 0.01-5% m/m.

In a further embodiment of the invention, the amount of the substituted disulphide present in the substituted disulphide solution of this invention is chosen on the basis of at least equimolarity to the amount of the mercaptan that is to be removed. Preferably, the amount of the substituted disulphide constitutes 0.001-10% m/m of the absorption medium used in the process of this invention, preferably 0.01-10% m/m and more particularly 0.01-5% m/m.

The absorption medium further comprises a base. The base catalyses the reaction between the substituted disulphide and the $R_1$SH mercaptan. In the absence of a base the reaction proceeds hardly notable. Therefore, according to the present invention, at least a catalytic amount of the base must be present in the absorption medium, wherein the term "catalytic" refers to the action of the base to significantly accelerate (meaning an acceleration of time of reaction with a factor of more than 10, preferably more than 100) the reaction between the $R_1$SH mercaptan and the substituted disulphide. To such extent, an amount of at least 3 mol %, preferably at least 5 mol % of the base should be present with regard to the amount of the substituted disulphide. In addition, the base may reversibly or irreversibly react with acid components in the mercaptan-comprising gas stream. Such acid components include but are not limited to hydrogen sulphide, carbon dioxide and/or COS. Reversibility of any reaction of the base with acid components in the mercaptan-comprising gas stream depends on the nature, in particular the pKa of the base. To ensure that a catalytic amount of unreacted or free base is present in the absorption medium at any stage in the process wherein the absorption medium is contacted with the mercaptan-comprising gas stream, the amount of base present in the absorption medium compared to the amount of acid components in the mercaptan-comprising gas stream, which is contacted with the absorption medium, must exceed the stoichiometric ratio at which the base would react with the acid components. The required concentration of base can be determined based on the chemical nature of the base and the acid components. For instance, $NEt_3$ will react with hydrogen sulphide or carbon dioxide in a 1:1 ratio. Preferably, in case the mercaptan-comprising gas stream comprises acid components, the mol ratio of base present in the absorption medium compared to the acid components in the mercaptan-comprising gas stream, which is contacted with the absorption medium, is at least 1.1, more preferably at least 1.5, even more preferably at least 2 times the stoichiometric mol ratio.

Based on the acid component content of the mercaptan-comprising gas stream and the volume of mercaptan-comprising gas stream contacted per unit absorption medium, the minimum amount of base required can be easily determined.

As mentioned herein above the base may react with the acid components in the mercaptan-comprising gas stream. Depending on the strength of the base this reaction may be reversible or irreversible. Generally two types of base can be identified:

strong bases, i.e. bases having a pKa of 14 or higher; and
weak bases, i.e. having a pKa below 14

Generally, the reaction of strong bases such as NaOH, KOH, $Ca(OH)_2$ and $Ba(OH)_2$ is irreversible, whereas reactions with weaker bases, such as $NEt_3$, alanine, ammonia, methylamine, sodium acetate, sodium carbonate or pyridine are generally reversible.

Preferred bases are weak bases as these do not lead to irreversible reaction with any to the acid components in the mercaptan-comprising gas. Preferably the base has a pKa below 14, more preferably a pKa below 11.

Reference herein to the pKa of a base is to the pKa as determined by ASTM D1067-06.

The absorption medium may be a liquid or solid absorption medium, more preferably it is a liquid absorption medium, i.e. it is liquid under the conditions at which it is contacted with the mercaptan-comprising gas stream. The absorption medium may for instance be a liquid disulphide with the base dissolved therein or a liquid base with the disulphide dissolved therein.

The absorption medium may be in the form of a solution, suspension or emulsion. Preferably, the absorption medium is a liquid solution comprising the substituted disulphide and the base dissolved therein. More preferably, the absorption medium is an aqueous or organic solution comprising the substituted disulphide and the base dissolved therein. The organic solution may be polar or non-polar.

Examples of suitable absorption media include but are not limited to water, alcohols, ketones, ethers and glycols. Preferred absorption media include water, dimethyl ether, DMF, heavy hydrocarbons, and (poly)ethylene- and (poly)propylene glycol and their ethers.

In a preferred embodiment, the process according to the invention is preceded by a conventional amine-based separation process for removing acid components such as hydrogen sulphide, carbon dioxide and COS from a gas stream comprising such components.

Reference herein to an amine-based separation process is to a process comprising an amine-containing absorption liquid. The amine based separation process is typically performed in an amine treating unit. Such amine treating units are well known for extracting hydrogen sulphide and/or carbon dioxide from gas stream. These amine treating units generally are based on a contactor (also referred to as absorber) for contacting a gaseous stream with a liquid absorbent. The amine based separation process is based on a washing process wherein a gas stream is washed with a chemical absorbent, in particular an aqueous amine solution. The gas stream is separated by chemical adsorption of certain components. i.e. hydrogen sulphide and carbon dioxide, in the gas stream (solvent extraction).

These amine based separation processes have been extensively described in the art. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

The chemical absorbents, which are useful in the amine-based separation processes, preferably, comprise an aliphatic alkanolamine and a primary or secondary amine as activator, the action of which accelerates the rate of $CO_2$ absorption. The chemical absorbent may further comprise water or another suitable solvent. Preferred aliphatic alkanolamines include monoethanolamine (MEA), di-isoproponalamine (DIPONA) and tertiary alkanolamines, especially triethanolamine (TEA) and/or methyldiethanolamine (MDEA). Suitable activators include primary or secondary amines, especially those selected from the group of piperazine, methylpiperazine and morpholine. Preferably, the chemical absorbent comprises in the range of from 1.0 to 5 mol/l, more preferably from 2.0 to 4.0 mol/l of aliphatic alkanolamine. Preferably, the chemical absorbent comprises in the range of from 0.5-2.0 mol/l, more preferably from 0.5 to 1.5 mol/l of the primary or secondary amine as activator. Especially preferred is a chemical absorbent comprising MDEA and piperazine. Most preferred is a chemical absorbent comprising in the range of from 2.0 to 4.0 mol/l MDEA and from 0.8 to 1.1 mol/l piperazine. These chemical absorbents-based absorption liquids already contain a base and have the additional advantage that they efficiently remove carbon dioxide, COS and hydrogen sulphide from the mercaptan-comprising gas stream, if present, in particular at high pressures.

By pre-treating the mercaptan-comprising gas stream with an amine-based separation process, the acid component content of the mercaptan-comprising gas stream is lowered if not removed in total, thereby reducing the amount of base required in absorption medium. In case a strong base is used in the absorption medium it also reduces the amount of base consumed by the process.

As mentioned herein above, during step (b) of the process $R_1$—SH mercaptans are removed from the mercaptan-comprising gas stream. At the same time, the absorption medium is loaded with the reaction products of the reaction between the $R_1$—SH mercaptans and the $R_2$—SS—$R_3$.

Preferably, the loaded absorption medium is regenerated and recycled back to step (b) of the process, while the desorbed mercaptans, and optionally hydrogen sulphide, carbon dioxide and COS or the products of an irreversible reaction between the base and hydrogen sulphide, carbon dioxide and COS, are retrieved separately. Therefore, preferably, the process further comprises the steps:

c) retrieving the absorption medium from step (b);
d) regenerating the absorption medium
e) providing the regenerated absorption medium to step (b).

The reaction between the $R_1$—SH mercaptans and the $R_2$—SS—$R_3$ is an equilibrium reaction. By withdrawing $R_1$—SH mercaptans in a regeneration step, the $R_1$—SH mercaptan absorption reaction is reversed and $R_1$—SH mercaptans are obtained.

The loaded absorption medium may be regenerated by stripping the loaded absorption medium with a gas, such as nitrogen or steam.

Preferably, the loaded absorption medium is regenerated by subjecting the absorption medium to an elevated temperature, preferably a temperature in the range of from 80 to 200° C., even more preferably of from 100 to 175° C. By subjecting the loaded absorption medium to an elevated temperature, the desorption process is advantaged and in addition, this allows for an efficient desorption of hydrogen sulphide, carbon dioxide and COS, if these were absorbed from the mercaptan-comprising gas stream.

Preferably, the loaded absorption medium is regenerated by stripping the loaded absorption medium with a gas at elevated temperatures, such as those temperatures mentioned herein above.

In case some of the base is consumed or otherwise lost in the process, it may be preferably to add fresh base to the regenerated absorption medium prior to or during step (e), i.e. providing the regenerated absorption medium to step (b).

It is preferred that the base is retained in the phase that is recycled back to step (b).

The process according to the invention may be operated in batch, semi continuous or continuous mode. Preferably, the process is operated in continuous mode, more preferably by passing the mercaptan-comprising gas stream and separately a stream of absorption medium through a contactor, wherein both streams are continuously contacted. A mercaptan-depleted gas stream, (or second gas stream) is continuously retrieved from the contactor, while simultaneously a stream of loaded absorption medium is retrieved from the contactor. The stream of loaded absorption medium is preferably sent to a regeneration unit to be regenerated and recycled to the inlet of the contactor. The mercaptan-comprising gas stream and a stream of absorption medium are preferably contacted counter-currently. By contacting the mercaptan-comprising gas stream and the stream counter currently, the mercaptan-comprising gas stream is contacted with fresh or freshly regenerated absorption medium, comprising the highest amount of base prior to exiting the contactor. This significantly reduces the effect of any acid compounds in the mercaptan-comprising gas stream on the concentration of unbound base in the absorption medium.

The mercaptan-comprising gas stream is preferably contacted with the absorption medium at a temperature in the range of from 0 to 100° C., more preferably of from 10 to 70° C., even more preferably 20 to 60° C. By reducing the temperate the choice of liquid and/or solid absorption media becomes broader.

The mercaptan-comprising gas stream is preferably contacted with the absorption medium under any suitable pressure, preferably a pressure in the range of from 1 to 150 bar absolute, more preferably, 20 to 100 bar absolute, even more preferably 30 to 75 bar absolute.

In case of a continuous process wherein both mercaptan-comprising gas and the absorption medium are continuously contacted, the mercaptan-comprising gas may preferably be supplied to the process at any suitable ratio to the absorption medium. Preferably, the weight ratio of the mercaptan-comprising gas flow ($kg_{gas}$/h) to the flow of absorption medium ($kg_{medium}$/h) is in the range of from 0.1 to 100.

The substituted disulphide may be any substituted disulphide according to general formula (2).

$R_2$ and $R_3$ may be any suitable substituent. Preferably, $R_2$ and $R_3$ are chosen such that the corresponding $R_2$—SH and/or $R_3$—SH thiol have a boiling temperature above the temperature of the mercaptan-comprising gas stream. More preferably, $R_2$ and $R_3$ are chosen such that the corresponding $R_2$—SH and/or $R_3$—SH thiols are liquid or dissolved in the absorption medium at the temperature and pressure conditions at which the mercaptan-comprising gas stream is contacted with the absorption medium.

At least one of $R_2$ and $R_3$ is an electron withdrawing group.

Electron withdrawing groups are well known in the art, and are for example selected from:
substituted alkyl comprising at least 5 carbon atoms, preferably comprising at least 7 carbon atoms, more preferably at least 10;
optionally substituted aryl comprising 6 to 14 carbon atoms (such as phenyl, naphthyl, toluoyl, and the like); or optionally substituted heteroaryl group comprising 5 to 13 carbon atoms (such as pyrolyl, thiophenyl, furanyl and pyridinyl); wherein each of the substituents may be selected from one or more —OH, —SH, halogen (preferably fluoro), carboxylic acid, carboxylate, amino (for example —NH$_2$, —NH(alkyl), —N(alkyl)$_2$, wherein the alkyl group comprises 1 to 6 carbon atoms and may be substituted with —OH), nitro, ether and thioether (such as —O—((C1-C4)alkyl) and —S—((C1-C4)alkyl)), ester (such as —O—C(O)—((C1-C4)alkyl), —C(O)—O—((C1-C4)alkyl), and the like), sulfonic acid, sulfonyl (such as ((C1-C4)alkyl)sulfonyl, tosylsulfonyl and the like), sulfonate groups (such as ((C1-C4)alkyl)sulfonate, triflate, tosylate and besylate), and the like.

Alkyl groups as mentioned herein may be branched or unbrached alkyl groups. The term (C1-C4)alkyl refers to an alkyl group with 1 to 4 carbon atoms.

Further suitable $R_2$ and $R_3$ groups include:
alkyl groups comprising at least 5 carbon atoms, preferably comprising at least 7 carbon atoms, more preferably at least 10;
alkenyl groups comprising at least 5 carbon atoms, preferably comprising at least 7 carbon atoms, more preferably at least 10;
alkynyl groups comprising at least 5 carbon atoms, preferably comprising at least 7 carbon atoms, more preferably at least 10;
cycloalkyl groups comprising at least 5 carbon atoms;
alkoxy groups, including ketones, aldehydes; (poly)ethers, (poly)esters, carboxylic acid and carboxylate groups;
amine and amino groups;
polymers;
wherein the alkyl group is defined as mentioned herein before.

Suitable $R_2$ and $R_3$ substituents further include substituents comprising a combination of any of the functional groups mentioned herein above, for example a combined aryl and alkanol group such as a phenolic substituent group. In case an alkyl, alkenyl or alkynyl is combined with another functional group to from a substituent an alkyl, alkenyl or alkynyl comprising any number of carbon atoms may be used such as for instance ethylphenylic substituent group.

Reference herein to aryl groups is to comprising one or more aromatic ring structures, including polycyclic and naphthenic ring structures, for example 2,2'-dithiobisbenzothiazole.

Reference herein to substituted aryl groups is to aryl groups comprising one or more phenyl rings, wherein the aryl group further comprises at least one other functional group, for example benzoic acid.

Preferred $R_2$ and $R_3$ substituents comprise electron deficient (electron withdrawing) functional groups such as aromatic groups, carboxylate groups and groups comprising unsaturated carbon-carbon bonds. Such substituents result in a disulphide with a higher tendency to react with the $R_1$—SH mercaptan.

Preferred $R_2$ and $R_3$ substitutes comprise both electron deficient functional groups as well as further functional groups that improve solubility in the absorption medium. In case of an aqueous absorption medium or polar organic absorption medium, the further functional groups are preferably hydrophilic functional groups, more preferably those that can form hydrogen bonds. Examples of hydrophilic functional groups include alcohols, acids, carboxylates, amines, sulphuric and sulphurous groups. Such hydrophilic functional groups increase the tendency of the substituted disulphide to interact, and preferably dissolve, in alkaline, preferably aqueous alkaline, liquids. In case of an non-polar organic absorption medium, the further functional groups are preferably hydrophobic functional groups. Examples of hydrophobic functional groups include aryl, alkyl, alkenyl and alkynyl groups. Such hydrophobic functional groups increase the tendency of the substituted disulphide to interact, and preferably dissolve, in non-polar organic liquids.

Particularly preferred $R_2$ and $R_3$ substitutes comprise both electron deficient functional groups as well as functional groups that improve the solubility of the disulphide, as well as the formed $R_2SH$ and/or $R_3SH$ thiols and $R_1$ comprising disulphides, in chemical-based absorption liquids, examples of such functional groups include acids, amines, alcohols and polyethylene glycols.

Preferably, the $R_2$—SS—$R_3$ substituted disulphide is soluble in the absorption medium, preferably an aqueous or organic absorption medium, in the presence of the base. More preferably, the obtained $R_2$—SS—$R_1$ and/or $R_1$—SS—$R_3$ are also soluble in the absorption medium, preferably an aqueous absorption medium or organic absorption medium, in the presence of the base. More preferably, the obtained $R_2$—SH and $R_3$—SH are also soluble in the absorption medium, preferably an aqueous absorption medium, in the presence of the base.

Selection of the right substituents $R_2$ and $R_3$ depends on the nature of the absorption medium and is, based on the information provided herein above, within the general knowledge of the skilled person.

In case, at least one of substituents $R_2$ and $R_3$ is a alkyl thiol, the obtained $R_2$—SH and $R_3$—SH may be dithiols.

Preferred substituted disulphides include, but are not limited to: diphenyl disulphide, ditolyl disulphide, di-nitrophenyl disulfide, dithiodibenzoic acid, di-(oligoethyleneglycol-phenyl)disulphide, dinaphtyl disulphide, dipyridyl disulphide, 2,2'-dithiobisbenzothiazole.

Particularly preferred substituted disulphides, as they dissolve well in the chemical-based absorption liquids mentioned herein above, include, but are not limited to: dithiodibenzoic acid, dithiodi(potassium benzoate) and di-(oligoethyleneglycol-phenyl)disulphide.

In one particular embodiment, at least one of substituents $R_2$ and $R_3$ is a polymer. Polymeric thiols have very low to almost no vapour pressure. The polymer-based disulphide may be provided as a solid absorption medium or as dispersion in a liquid medium.

The mercaptan-comprising gas stream may be any gas stream comprising mercaptans. Preferably, the mercaptan-comprising gas stream is natural gas. Reference herein to natural gas is to a gas, which generally comprises mainly methane and can further comprise other components such as higher hydrocarbons. The higher hydrocarbons are typically referred to as condensate or condensate components and may include e.g. ethane, propane, butanes, pentanes, benzene, toluene and xylenes. Natural gas may further include components such as nitrogen, carbon dioxide, sulphur contaminants and mercury. The amount and type of sulphur contaminants can vary. Common sulphur contaminants are hydrogen sulphide ($H_2S$), mercaptans (RSH) and carbonyl sulphide (COS).

It will be appreciated that the composition of the natural gas stream depends on the natural gas field it is extracted from. Typically, the natural gas comprises predominantly methane, preferably in the range of from 40 to 99 vol % methane, more preferably 60 to 99 vol % methane, more preferably 60 to 99 vol %, based on the total mercaptan-comprising natural gas stream.

Preferably, the amount of mercaptans in the gas stream supplied to process is in the range of from 1 ppmv to 5 vol %, based on the total mercaptan-comprising gas stream, preferably from 5 ppmv to 5 vol %, more preferably from 6 ppmv to 3 vol %, still more preferably from 10 ppmv to 1500 ppmv.

The mercaptan-comprising gas stream may comprise up to 20 vol % of acid components, based on the total mercaptan-comprising gas stream. Preferably, the mercaptan-comprising gas stream comprises in the range of from 0 to 5 vol % of acid components, preferably of from 0 to 1 vol %, even more preferably of from 0 to 0.01 vol % acid components, still more preferably of from 0 to 10 ppmV, based on the total mercaptan-comprising gas stream. A lower acid components content is beneficial as less base will be bound by the acid components and thus free for catalysing the process.

Typical acid components include, but are not limited to, hydrogen sulphide, carbon dioxide and or COS.

Preferably, the mercaptan-comprising gas stream comprises up to 20 vol % hydrogen sulphide, based on the total mercaptan-comprising gas stream. Preferably, the mercaptan-comprising gas stream comprises in the range of from 0 to 5 vol % hydrogen sulphide, preferably of from 0 to 1 vol %, even more preferably of from 0 to 0.01 vol % hydrogen sulphide, still more preferably of from 0 to 10 ppmV, based on the total mercaptan-comprising gas stream. A lower hydrogen sulphide content is beneficial as less base will be bound by the hydrogen sulphide and thus free for catalysing the process.

Preferably, the gas stream comprises no or essentially no oxygen (less than 1 ppm).

Preferably, the mercaptan-comprising gas stream comprises up to 20 vol % carbon dioxide, based on the total mercaptan-comprising gas stream. Preferably, the mercaptan-comprising gas stream comprises in the range of from 0 to 5 vol % carbon dioxide, preferably of from 0 to 1 vol %, even more preferably of from 0 to 0.01 vol % carbon dioxide, still more preferably of from 0 to 10 ppmV, based on the total mercaptan-comprising gas stream. A lower carbon dioxide content is beneficial as less base will be bound by the carbon dioxide and thus free for catalysing the process.

Preferably, the mercaptan-comprising gas stream comprises up to 5000 ppmv, more preferably the mercaptan-comprising gas stream comprises in the range of from 0 to 5000 ppmv, more preferably of from 0 ppmv to 500 ppmv, even more preferably of from 0 ppmv to 10 ppmv of COS, based on the total mercaptan-comprising gas stream. A lower COS content is beneficial as less base will be bound by the COS and thus free for catalysing the process In case the mercaptan-comprising gas stream comprises mercury it is preferred that the mercury is removed.

Preferably, the mercaptan-comprising gas stream comprises little to no hydrogen and/or carbon monoxide, more preferably no more than 20 vol % based on the total volume of the mercaptan-comprising gas stream, even more preferably, no more than 1 vol % hydrogen and/or carbon monoxide. At prolonged contact times these components may irreversibly react with some of the disulphide.

In another aspect the invention relates to a substituted disulphide solution wherein the substituted disulphide and the base are those described herein above for the process according to the invention and are mutatis mutandis subject to the same preferences described herein above for the process according to the invention. Preferably, the substituted disulphide solution further comprises water or an organic solvent.

The invention is illustrated by the following non-limiting examples

EXAMPLE 1

Experiments were conducted to show the reaction between a mercaptan and a substituted disulphide. In the experiment a dodecanethiol was used to mimic a C1 to C4 mercaptan present in the gas stream according to the present invention. This was done in view of safety considerations involved with the use of C1 to C4 mercaptans.

(a) 49 mg (0.22 mmol) of diphenyl disulphide (Ph-SS-Ph) together with 46 mg of dodecanethiol ($C_{12}H_{25}$—SH, 0.23 mmol) was weighed into $CDCl_3$ in a NMR tube. The conversion at room temperature was followed by NMR. After 3 days <5% conversion had taken place.

(b) 118 mg (0.54 mmol) of Ph-SS-Ph was weighed into a NMR tube. In a vial, 46 mg (0.23 mmol) of $C_{12}H_{25}$—SH was dissolved in $CDCl_3$' (0.5 ml) and added to the NMR tube. A NMR spectrum was taken of the mixture displaying both compounds. No reaction products were observed confirming that no reaction has taken place.

Subsequently, 15 mol % of $NEt_3$ (triethyl amine) base, based on the number of moles Ph-SS-Ph, was added to the mixture in the NMR tube and the extent of the reaction was monitored by taking NMR spectra while keeping the tube at 25° C.

The extent of the reaction was monitored by the appearance of the Ph-SS—$C_{12}H_{25}$ signal. Immediately following the addition of the base, the formation of Ph-SS—$C_{12}H_{25}$ was observed. In addition, formation of $C_{12}H_{25}$—SS—$C_{12}H_{25}$ was also observed, but this is a minor product (<5%). In table 1 the normalised concentration of dodecanethiol, i.e. the concentration at any time divided by the initial concentration, is given versus the time.

It will be clear from table 1 that in the presence of a base that the dodecanethiol is removed from the solution and converted to a corresponding substituted disulphide and phenylthiol.

TABLE 1

| time [min] | Normalised $C_{12}H_{25}SH$ conc. [—] |
|---|---|
| 0 | 1.0 |
| 2 | 0.96 |
| 4 | 0.90 |
| 7 | 0.84 |
| 10 | 0.78 |
| 19 | 0.62 |
| 67 | 0.29 |

EXAMPLE 2

Stock solutions of Ph-SS-Ph (462 mg in 3 ml $C_2H_4Cl_2$, 0.7 M), $C_{12}H_{25}$—SH (57 mg in 3 ml $C_2H_4C_{12}$, 0.09 M) and $NEt_3$ (354 mg in 5 ml $C_2H_4Cl_2$, 0.07 M) were prepared. A predetermined amount of the solutions of Ph-SS-Ph (0.1 or 0.2 ml) and $C_{12}H_{25}$—SH (0.1 or 0.2 ml) were combined in a cuvet and additional $C_2H4C_{12}$ was added such that after addition of the $NEt_3$ solution the total volume would become 0.6 ml.

Using a UV-spectrometer, a background absorption spectrum was measured.

A timed measurement was started (typically, a spectrum every minute), and the solution of $NEt_3$ (0.1 or 0.2 ml) was added. After vigorous stirring, the reaction was monitored by UV absorption and kept at room temperature. Depending on the concentration, the reaction extend was monitored at 360-380 nm by the disappearance of the Ph-SS-Ph absorption, which was fitted by an exponential decay curve to determine the speed of the reaction.

As can be seen from table 2, it was shown that the speed of the reaction increases with the concentration of both Ph-SS-Ph and $NEt_3$, as shown by the $t_{1/2}$ values, which represent the time at which 50 mol % of the initial dodecane thiol concentration has reacted.

EXAMPLE 3

In a procedure similar to example 2, an experiment was performed using PhSSPh (19 mg) and $C_{12}H_{25}SH$ (4 mg) in $C_2H_4Cl_2$ (0.6 ml), whereby the $NEt_3$ base was replace by MDEA, which is an amine-based base typically found in chemical absorbent-based amine absorption liquids. After addition of a MDEA (0.1 ml), the speed of the reaction was judged by the decay of the UV-vis absorption signal, and can be found in Table 2, showing that MDEA behaves similar to $NEt_3$.

TABLE 2

| | PhSSPh Conc. [mol/l] | $C_{12}H_{25}SH$ Conc. [mol/l] | Base Conc. [mol/l] | $t_{1/2}$ [min$^{-1}$] |
|---|---|---|---|---|
| Expl. 2 | 0.2 | 0.02 | 0.2 | 3.2 |
| | 0.2 | 0.02 | 0.1 | 7.2 |
| | 0.1 | 0.02 | 0.1 | 10.2 |
| | 0.1 | 0.02 | 0.2 | 5.7 |
| | 0.15 | 0.02 | 0.15 | 5.8 |
| Expl 3 | 0.123 | 0.02 | 1.03 | 10.1 |

EXAMPLE 4

A further experiment was conducted to show ability of the absorption medium comprising a substituted disulphide and amine base to capture C1 to C4 mercaptans from a gas phase.

In a batch experiment, i.e. without regeneration, 25' ml of an amine-containing solution was contacted with a methylmercaptan-containing gas by passing a nitrogen gas stream containing 1 vol % of methylmercaptan, based on the total gas stream, through the amine-containing solution at atmospheric pressure and a temperature of 20° C. A flow rate of 0.5 Nl/h was applied. The solution was continuously stirred at 250 rpm. The tested amine solutions are provided in table 3. In example 4a and 4b an organic solutions was used, while an examples 4c and 4d an aqueous solution is used. In example 4c, a solution of MDEA in water was used, such a solution is a common part of a chemical absorbent based-absorption liquid used in typical amine treating units suitable for absorbing hydrogen sulphide and carbon dioxide.

The methylmercaptan breakthrough, i.e. the concentration in the effluent gas stream at any time divided by the originally methylmercaptan concentration in the nitrogen gas stream, was determined.

In Table 3, time required to reach a methylmercaptan breakthrough of 0.5 is shown for each of the tested solutions.

TABLE 3

| Expl. | volume [ml] | $NEt_3$ [vol %] | MDEA [vol %] | $C_2H_4Cl_2$ [vol %] | $H_2O$ [vol %] | PhSSPh [g] | (2-$CO_2$H—PhS)$_2$* [g] | $CH_4SH$ breakthrough >0.5 [min] |
|---|---|---|---|---|---|---|---|---|
| 4a | 25 | 25 | — | 75 | — | — | | 300 |
| 4b | 25 | 25 | — | 75 | — | 1.5 | | >1800# |

TABLE 3-continued

| Expl. | volume [ml] | NEt$_3$ [vol %] | MDEA [vol %] | C$_2$H$_4$Cl$_2$ [vol %] | H$_2$O [vol %] | PhSSPh [g] | (2-CO$_2$H—PhS)$_2$* [g] | CH$_4$SH breakthrough >0.5 [min] |
|---|---|---|---|---|---|---|---|---|
| 4c | 25 | — | 25 | — | 75 | | — | 82.8 |
| 4d | 25 | — | 25 | — | 75 | | 0.75 | 1296 |

*2,2'-Dithiodibenzoic acid
after 1800 minutes no CH$_4$SH breakthrough was observed It will be clear from Table 3 that the addition of a substituted disulphide to the amine-containing absorbent, in the presence of a base, results in a significant delay of the methylmercaptan breakthrough. By a continuous process, wherein the substituted disulphide-containing solution is regenerated and recycled, a continuous removal of mercaptan, can be achieved.

EXAMPLE 5

A further experiment was conducted to show ability of the absorption medium comprising a substituted disulphide and amine base to capture C1 to C4 mercaptans from a gas phase. The experiment was conducted similar to example 4, instead a gas flow rate of 1.2 Nl/h was employed. The tested amine solutions are provided in table 4.

In all examples, a solution of MDEA in water was used, such a solution is a common part of a chemical absorbent-based absorption liquid used in typical amine treating units suitable for absorbing hydrogen sulphide and carbon dioxide.

The methylmercaptan breakthrough, i.e. the concentration in the effluent gas stream at any time divided by the originally methylmercaptan concentration in the nitrogen gas stream, was determined. In Table 4, time required to reach a methylmercaptan breakthrough of 0.5 is shown for each of the tested solutions.

From table 4, it can be concluded that the different water soluble disulfides bearing sufficiently electron deficient (electron withdrawing), aromatic, substituents (examples 5b-5d) are capable of greatly enhancing the mercaptan removal capacity of the asorbent liquid as compared to the blank not containing the disulfide agent (example 5a). From example 5e, it appears that electron rich disulphides such as, in this case, alkyl substituted disulphides, are less efficient as mercaptan removal agents. Example 5f shows a mixed profile for mixed disulphides; the capacity to remove mercaptans appears to be related to the behaviour of both substituents as one skilled in the art may expect from the behaviour of the corresponding homogeneous disulphides.

TABLE 4

| Expl. | volume [ml] | MDEA [mass %] | H$_2$O [mass %] | R$^1$SSR$^2$ (5 m %) | CH$_4$SH breakthrough >0.5 [min] |
|---|---|---|---|---|---|
| 5a | 25 | 50 | 50 | — | 60 |
| 5b | 25 | 50 | 45 | R$^1$=R$^2$=4-CO$_2$K—Ph | 600 |
| 5c | 25 | 50 | 45 | R$^1$=R$^2$=4-(EO)$_3$-Ph* | 660 |
| 5d | 25 | 50 | 45 | R$^1$=R$^2$=4-SO$_3$—Ph | 660 |
| 5e | 25 | 50 | 45 | R$^1$=R$^2$=KO$_2$C—CH$_2$—CH$_2$ | 120** |

*EO = ethyleneoxide
**breakthrough is quick, but a slow continuing reaction is observed

What is claimed is:

1. A process for removing mercaptans from a gas stream, comprising the steps:
   a) providing a gas stream comprising at least:
      a mercaptan of the general formula:

R$_1$—SH, wherein R$_1$ is an alkyl group comprising 1 to 4 carbon atoms and
      an acid component, wherein the acid component is present in the gas stream in an amount in the range of from 0 to 20% by volume of the gas stream and
   b) contacting the gas stream with an absorption medium to obtain a mercaptan-depleted gas stream, wherein the absorption medium comprises:
      a substituted disulphide, wherein the substituted disulphide is of the general formula:

R$_2$—SS—R$_3$, wherein R$_2$ and R$_3$ are carbon comprising substituents of which the corresponding R$_2$—SH and R$_3$—SH thiols have a vapour pressure below the vapour pressure of any R$_1$—SH thiol and at least one of R$_2$ and R$_3$ is an electron withdrawing group; and
      a base, wherein the base is present in the absorption medium in an amount that exceeds the stoichiometric mol ratio at which the base will react with the acid component in the gas stream by at least a catalytic amount.

2. A process according to claim 1, wherein the acid component is present in the gas stream in an amount in the range of from 0 to 1% by volume of the gas stream.

3. A process according to claim 1, wherein the acid component includes hydrogen sulphide, carbon dioxide or COS.

4. A process according to claim 1, wherein the absorption medium is a solution comprising the substituted disulphide and the base.

5. A process according to claim 1, wherein the absorption medium is an aqueous or organic solution comprising the substituted disulphide and the base.

6. A process according to claim 1, further comprising the steps:
   c) retrieving the absorption medium; and
   d) regenerating the absorption medium.

7. A process according to claim 6, wherein the absorption medium is regenerated by subjecting the absorption medium to an elevated temperature in the range of from 80 to 200° C.

8. A process according to claim 6, further comprising adding additional base to the regenerated absorption medium.

9. A process according to claim 1, wherein at least one of R$_2$ and R$_3$ is an alkanol, alkoxy, aryl group or substituted arylgroup.

10. A substituted disulphide solution comprising:
a) 1 to 10 mass % of a substituted disulphide of the general formula:

$$R_2\text{—SS—}R_3,$$

wherein $R_2$ and $R_3$ are carbon comprising substituents of which the corresponding $R_2$—SH and $R_3$—SH thiols have a vapour pressure below the vapour pressure of any butyl-SH thiol, and at least one of $R_2$ and $R_3$ is an electron withdrawing group, and
b) a base; wherein the base is present in at least 3 mol % with regard to the amount of the substituted disulphide.

11. The substituted disulphide solution of claim 10, wherein the solution is nonaqueous.

* * * * *